United States Patent
Hahn et al.

[15] 3,644,049
[45] Feb. 22, 1972

[54] MACHINE TOOL

[72] Inventors: Robert S. Hahn, Northboro; David H. Youden; Arthur F. St. André, both of Worcester, all of Mass.

[73] Assignee: The Heald Machine Company, Worcester, Mass.

[22] Filed: Nov. 26, 1969

[21] Appl. No.: 880,239

[52] U.S. Cl. ..........................................................408/10
[51] Int. Cl. .........................................................B23b 49/00
[58] Field of Search ...........................................77/1–4, 58; 82/14 D; 408/10

[56] References Cited

UNITED STATES PATENTS 2,267,186  12/1941  Blood ..............................................77/3
3,191,294  6/1965  Daugherty ......................................29/568

*Primary Examiner*—Francis S. Husar
*Attorney*—Norman S. Blodgett

[57] ABSTRACT

This invention relates to a machine tool and, more particularly, to apparatus for generating a surface of revolution with a single point tool where extreme accuracy is obtained by calculation of tool setting by means of electronic data processing.

4 Claims, 5 Drawing Figures

PATENTED FEB 22 1972

3,644,049

ROBERT S. HAHN
DAVID H. YOUDEN
ARTHUR F. ST. ANDRE
INVENTORS.

BY
Norman S. Blodgett

3,644,049

CUTTING FORCE LAW    $F_R = k_c S$

DEFLECTION CHARACTERISTIC    $X = \dfrac{F_r}{K}$

CUTTING RELATION    $z = S + \dfrac{k_c}{K} S$

ON REF. CUT    $X_1 = \dfrac{F_r}{K}$

AMOUNT TO BE FED    $z_2 = S_2 + \dfrac{k_c}{K} S_2 - X_1$

MACHINE TOOL

BACKGROUND OF THE INVENTION

Extremely accurate generation of surfaces of revolution can be performed by using a single point tool, but certain problems are encountered when the surface is internal. In that case, it is difficult, if not impossible, to support the outboard end of the toolholder and, in most cases, for instance, in the case of a boring machine, the tool is mounted on the end of a cantilevered toolholder. The toolholder is subject to deflection under the force of cutting, and this introduces an error into the generation of the final surface. While it is possible, by trial and error, to perform such machining work with a suitable size within acceptable limits, with the proper finish, and with the desired geometry, the operation then becomes a toolroom job. The skill of the machine operator is such as to make the operation an extremely expensive one and not adaptable to production techniques. These and other difficulties experienced with the prior art devices have been obviated in a novel manner by the present invention.

It is, therefor, an outstanding object of the invention to provide a machine tool capable of generating a surface of revolution to a high degree of accuracy.

Another object of this invention is the provision of a machine tool providing for accurate setting of the cutting element in response to instructions from electronic computing equipment operating with variable machining parameters as its input.

A further object of the present invention is the provision of a machine tool having an accurately adjustable tool position, which is simple and rugged in construction, which is readily operated by unskilled labor, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention has to do with a machine tool for producing a surface of revolution on a workpiece having a toolhead with a spindle rotatably mounted therein and a table adapted to carry the workpiece. A tool is mounted at one end of the spindle, the tool having a locating surface, and control means including an actuator for moving the tool radially of the axis of the spindle is provided. A gage is movable on occasion to measure the distance from the locating surface of the tool to the unfinished surface of revolution.

The value of force on the tool during a rough cut is stored in a memory element and so is the measurement of remaining stock as measured by the gage. A computer calculates and transmits to the actuator a signal sufficient in value to move the tool radially an amount adequate to produce a desired finish size for the surface of revolution.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
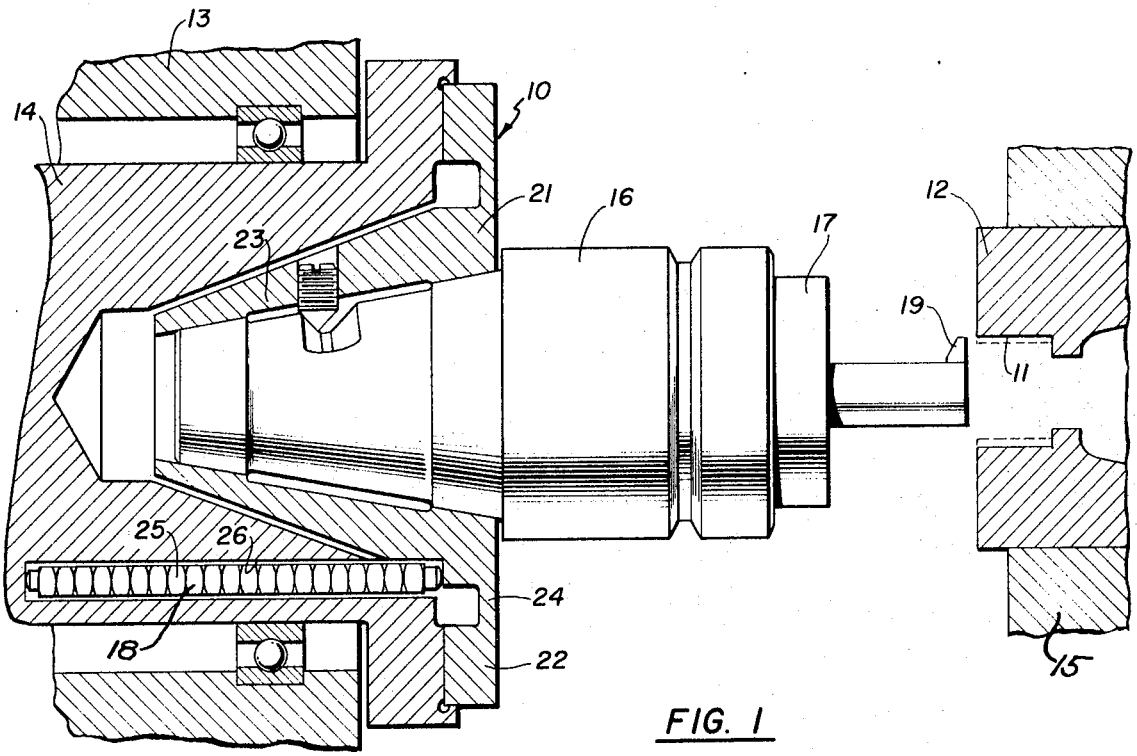
FIG. 1 is a vertical sectional view of a machine tool embodying the principles of the present invention.

Referring first to FIG. 1, wherein are best shown the general features of the invention, the machine tool, indicated generally by the reference numeral 10, is shown as producing a surface of revolution 11 on a workpiece 12. The machine tool is provided with a toolhead 13 having a spindle 14 rotatably carried therein. A work holding structure 15 forms part of the machine tool and carries the workpiece 12.

A tool 16 is mounted at one end of the spindle 14 and has a cylindrical locating surface 17. The machine tool is provided with a control means including an actuator 18 for moving the tool radially of the axis of the spindle 14. More specifically, a cutting element 19 is moved toward and away from the said axis.

The spindle 14 is provided with a toolholder 21 consisting of a ring 22 attached to the spindle and a socket element 23 for holding the tool. An integral diaphragm 24 joins the ring to the element. The actuator 18 consists of a stack of piezoelectric elements 25 which lie in a recess 26 and extend between the spindle and the socket element. The piezoelectric elements are capable of receiving an electrical signal to produce angular misalignment between the axis of the spindle and the axis of the toolholder 21 and, therefore, the tool 16. The stack of piezoelectric elements 25 is capable also of acting as a transducer to measure the force on the tool and emit an electrical signal proportional to the value of the force.

Figure 2:
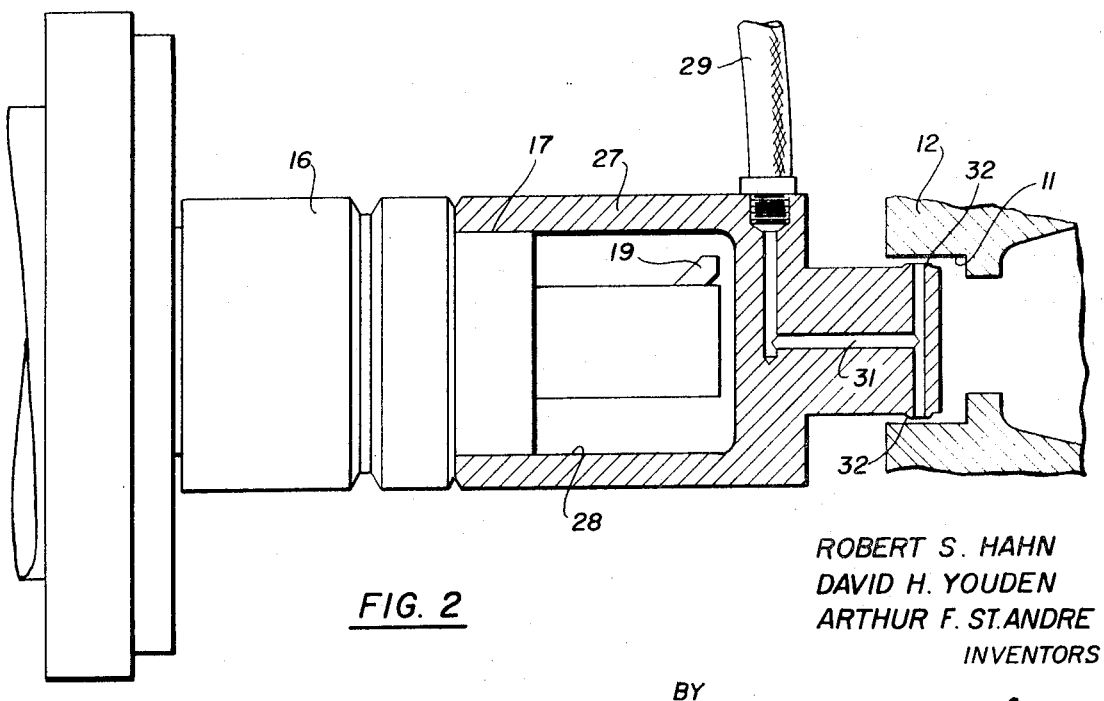
FIG. 2 is a side elevational view of the invention with a gage in place.

Referring now to FIG. 2, it can be seen that on occasion a gage 27 is movable to measure the size of the bore or surface 11 in the workpiece 12. The gage is provided with an internal bore 28 at one end which fits snugly over the cylindrical locating surface 17 on the tool 16. Extending into the other end of the gage is a conduit 29 connected to passages 31 extending through the body of the gage to nozzles 32. The nozzles 32 of the passage 31 and the conduit 29 form part of the well-known pneumatic gage and give an indication of the size of the bore 11. In other words, the gage measures the distance from the locating surface 17 to the surface 11 in an unfinished form and thus an indication of stock that must be removed to reach the finish size.

Figure 3:
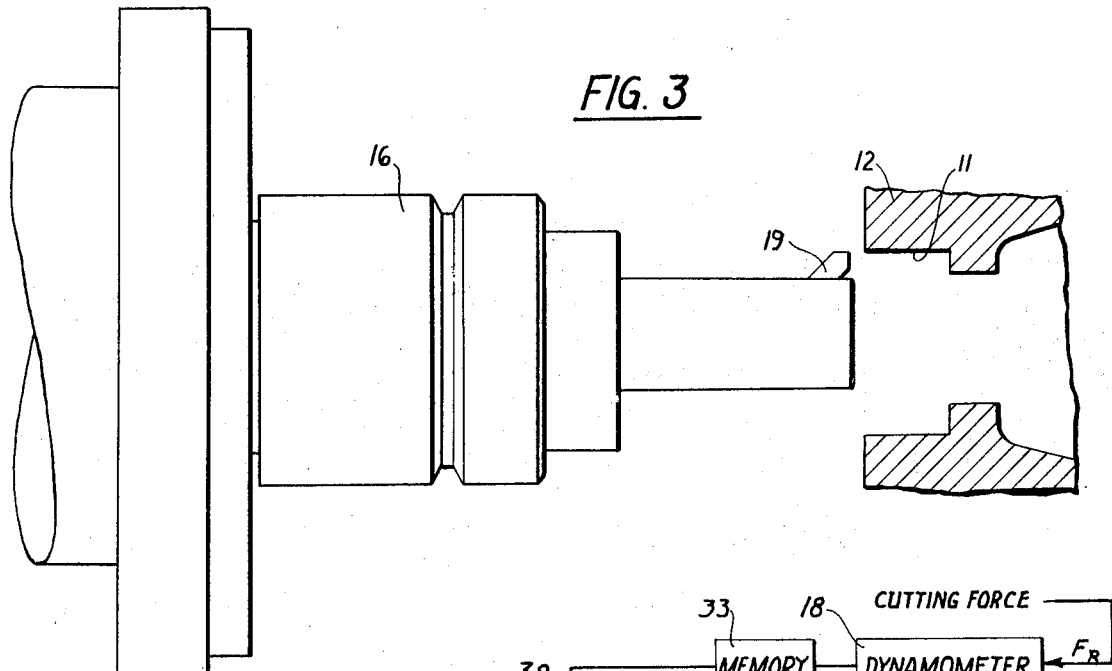
FIG. 3 is a side elevational view of the machine tool making a final cut.

In FIG. 3, the machine tool can be seen performing a finish cutting operation on the workpiece 12. The piezoelectric stack 18 has been presented with a signal sufficient to bring the cutting element 19 radially away from the axis of the spindle in an exact amount sufficient to give a perfect finished surface 11.

Figure 4:
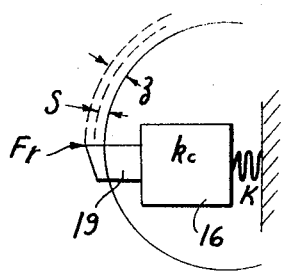
FIG. 4 is a schematic view of the machine tool operation showing the equations that regulate its operation.

FIG. 4 shows the manner in which the amount of deflection of the tool 16 is calculated in order to determine the amount of displacement necessary to result in an exact location of the cutting element 19. It also shows the equations which are used in setting up computing equipment to calculate this deflection. When the letter $S$ is used to indicate the radial depth of cut of the tool and $k_c$ is the cutting stiffness of the work material, then the cutting force $F_r$ is equal to $k_c \times S$. In general, it can be said that the amount of deflection $X$ is equal to $F_r/K$, where $K$ is the spring constant of the tool-workpiece system.

From this it can be seen, then, that the cutting relation formula indicates that $z$ (the amount to be fed radially) is equal to $S+(k_c S/K)$, where $S$ is the stock to be removed. In other words, the tool must be fed radially by an amount equal to the desired depth of cut $S$ plus the anticipated deflection $k_c S/K$. During a first roughing or reference cut, naturally the amount of deflection of the tool $X_1$ is equal to $F_r/K$. On the final cut, the tool has to be set out by an amount $z_2$ which is equal to the stock to be removed $S_2$ as determined by the gaging of the semifinished hole, plus the amount the boring will deflect on the finish cut $$\left(\frac{k_c S_2}{K}\right)$$

, minus the amount the boring bar was deflected during the reference cut $X_1$. Thus, on the final cut the tool should be set out a distance $z_2$, i.e., $$z_2 = S_2 + (k_c S_2/K) - X_1$$

Figure 5:
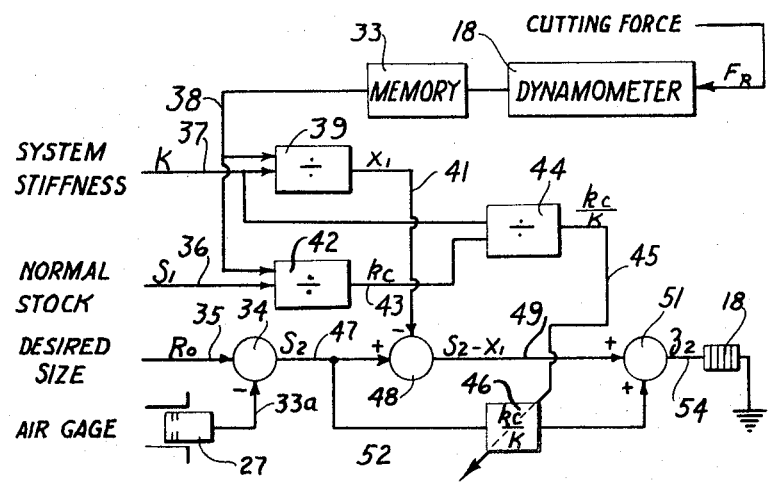
FIG. 5 is a flow chart showing the information received by and transmitted from a calculator forming part of the invention.

FIG. 5 shows how electronic computing equipment forming part of the controls makes use of these formulas to calculate a final cut. The control mean includes a memory storage 33 which receives from the dynamometer or piezoelectric elements or actuator 18 an electrical signal representing the cutting force $F_r$ experienced during a rough cut. The air gage 27 provides an electrical signal through a line 33a to an electrical voltage summing junction 34 which also receives a signal on a line 35 indicative of the desired final size $R_o$. The nominal stock size $S_1$ for the rough cut is received by the controls on a line 36 and the system spring constant or stiffness $K$ is introduced on the line 37. The cutting force signal $F_r$ retained by the memory 33 appears as a voltage on line 38. The voltages on the lines 37 and 38 representative of the first rough cutting force and the system stiffness $K$ are introduced into a divider 39 which derives a voltage on an output line 41 indicative of the deflection $X_1$ or $F_r/K$. The signals on the line 36 and the line 38 are introduced to a divider 42 which presents its output line 43 with an electrical signal indicative of the cutting stiffness $k_c$. The lines 37 and 36 are also connected to a calculator 44 whose output line 45 will carry the ratio of $k_c/K$. This is connected to a multiplying potentiometer 46.

The output line 47 from the mixing station 34 carries a voltage proportional to the finish stock allowance $S_2$ and presents this to a mixing station 48 which also receives the deflection $X_1$ on the line 41. The output line 49 of this station carries a value of $S_2-x_1$ and presents it to a mixing station 51. The value of $S_2$ is led from the line 47 by a line 52 to the calculator 46 which also receives a signal on the line 45. The output of this calculator $$\left(\frac{k_c S_2}{K}\right)$$

appears on a line 53 and is added at the mixing station 51 to the quantity $(S_2-X_1)$ so that its output line 54 carries a voltage $Z_2$ equal to $(S_2+k_c/K)S_2-X_2)$ and impresses this voltage on the actuator 18 capable of deflecting the tool 16 the exact amount necessary to give the desired finish size $R_o$.

The operation of the apparatus will now be readily understood in view of the above description. FIG. 1 shows the tool taking a first or rough cut on the workpiece 12. The force $F_r$ on the end of the tool is measured by the actuator 18 which sends a signal representative of that force to the memory 33 which generates a voltage on the line 38 representative of this force. In FIG. 2, the gage 27 is mounted on the tool and presented to the bore providing the surface 11 to be finished. This gage measures the size of the bore and presents this value through the conduit 29 to its own apparatus, resulting in a signal on the line 33 indicative of the size. This is related to the desired size in the mixing station 34 and results in a voltage signal $S_2$ equal to the amount of material yet to be removed. This is combined by the control means and the various calculators 39, 42, 44, and 46 to give a final electrical signal $Z_2$ which will operate on the actuator 18 to move the cutting element 19 radially. As shown in FIG. 3, it has been moved radially by an exact amount sufficient to give the desired finish size on a finish cut.

It can be seen, therefore, that by use of the control means consisting predominantly of data processing equipment, the automatic machine tool will provide very accurate machining without any particular care on the part of the operator. The equipment is rugged enough to withstand the rigors of a machine shop and yet is not unduly complex. It lends itself very well to ordinary production operations.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool for producing a surface of revolution on a workpiece, comprising
   a. a toolhead having a spindle rotatably mounted therein, the spindle having a toolholder consisting of a ring attached to the spindle and a socket element for holding the tool, a diaphragm joining the ring to the element,
   b. a work fixture adapted to carry the workpiece,
   c. a tool mounted at one end of the spindle, the tool having a locating surface,
   d. control means including an actuator for moving the tool radially of the axis of the spindle, the actuator being a stack of piezoelectric elements which extends between the spindle and the socket element and is capable of receiving an electrical signal to produce angular misalignment between the axis of the spindle and the axis of the tool, and
   e. a gage movable on occasion to measure the diameter of the surface of revolution.

2. A machine tool as recited in claim 1, wherein the stack of piezoelectric elements is capable of also acting as a transducer to measure the force on the tool and emit an electric signal proportional to the value of the force.

3. A machine tool for producing a surface of revolution on a workpiece, comprising
   a. a toolhead having a spindle rotatably mounted therein,
   b. a work fixture adapted to carry the workpiece,
   c. a tool mounted at one end of the spindle, the tool having a locating surface,
   d. control means including an actuator for moving the tool radially of the axis of the spindle, the control means including a memory storage for retaining the value of force on the tool during a rough cut, a memory storage for retaining the remaining stock as measured by the gage after the rough cut, and a computer for calculating and transmitting to the actuator a signal sufficient in value to move the tool radially an amount adequate to produce a desired finish size for the surface of revolution, and
   e. a gage movable on occasion to measure the diameter of the surface of revolution.

4. A machine tool as recited in claim 3, wherein the computer takes into consideration the rough cut force $F_r$, the system stiffness $K$, the nominal rough stock allowance $S_1$, the desired size $R_o$, the gage reading after rough cut, and the desired final size.

* * * * *